United States Patent
Dunn et al.

(10) Patent No.: US 9,596,629 B2
(45) Date of Patent: Mar. 14, 2017

(54) SYSTEMS AND METHODS FOR TRANSPARENT POINT-TO-POINT HANDOVERS OF A MOBILE RELAY

(75) Inventors: Douglas Dunn, San Diego, CA (US);
Amit Kalhan, San Diego, CA (US);
David Comstock, San Diego, CA (US);
Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 551 days.

(21) Appl. No.: 13/421,648

(22) Filed: Mar. 15, 2012

(65) Prior Publication Data

US 2013/0244569 A1    Sep. 19, 2013

(51) Int. Cl.
*H04B 7/15* (2006.01)
*H04W 36/00* (2009.01)
*H04B 7/155* (2006.01)

(52) U.S. Cl.
CPC ........ *H04W 36/0061* (2013.01); *H04B 7/155* (2013.01); *H04B 7/15507* (2013.01)

(58) Field of Classification Search
CPC ... H04W 36/32; H04W 84/005; H04W 36/00; H04W 36/0061; H04W 8/08; H04W 36/0005; H04W 36/0016; H04W 4/027
See application file for complete search history.

(56) References Cited

U.S. PATENT DOCUMENTS

| | | | |
|---|---|---|---|
| 2011/0194407 A1* | 8/2011 | Ji et al. | 370/226 |
| 2012/0250602 A1* | 10/2012 | Ou et al. | 370/315 |
| 2013/0336289 A1* | 12/2013 | Koifman et al. | 370/331 |
| 2013/0337813 A1* | 12/2013 | Van Phan et al. | 455/436 |
| 2014/0022981 A1* | 1/2014 | Kim et al. | 370/315 |

FOREIGN PATENT DOCUMENTS

| | | |
|---|---|---|
| EP | 2 023 674 A1 | 2/2009 |
| GB | 2479934 A | 11/2011 |
| WO | 03/015442 A1 | 2/2003 |
| WO | 2004/040933 A1 | 5/2004 |
| WO | 2005/027556 A1 | 3/2005 |

OTHER PUBLICATIONS

International Search Report dated Jun. 21, 2013, issued for International Application No. PCT/US2013/032062.

* cited by examiner

*Primary Examiner* — Ankur Jain

(57) ABSTRACT

Systems and methods for transparent handovers of mobile relays on high-speed vehicles. In an embodiment, a base station of a wireless communications network transmits identification data to a mobile relay on a high-speed vehicle. The identification data identifies base stations which are configured for transparent handovers. The network also receives data indicative of a scheduled path of the high-speed vehicle, which it uses to select a target base station for communication with the mobile relay. Once the target base station has been selected, the network begins servicing the mobile relay from the second base station, without requiring any measurement values from the mobile relay and without handover signaling.

30 Claims, 4 Drawing Sheets

SYSTEMS AND METHODS FOR TRANSPARENT POINT-TO-POINT HANDOVERS OF A MOBILE RELAY

FIELD OF THE INVENTION

The present disclosure generally relates to handovers of mobile relays, and more particularly to a system and technique for handing over a mobile relay's connection with a source base station to a target base station in a manner which is transparent to the mobile relay.

BACKGROUND

In many parts of the world, the construction and use of high-speed railways is growing tremendously. Network vendors and operators need to provide reliable communications via cellular networks for travelers using user equipment ("UE") on high-speed transportation systems, such as high-speed railways.

Cellular networks are radio networks which may be distributed over a large geographical area. The geographical area is divided into "cells." Each cell is generally served by at least one transceiver known as a "base station," which is often fixed in location. Together, the base stations may comprise a wireless wide area network ("WWAN"). The WWAN can also be communicatively coupled with a public or private network, which may include that particular aggregation of networks commonly known as the Internet.

UEs, which may be mobile and moving, are configured to establish connections with these base stations. These connections may be established, for example, using code division multiple access ("CDMA"), Global System for Mobile Communications ("GSM"), Universal Mobile Telecommunication System ("UMTS"), or the like. Through these connections with the base stations, the UEs are able to establish voice and/or data communications with each other and other transceivers or receivers within the network or within other connected networks, including the Internet.

The problem with using a UE on high-speed transportation systems in current cellular networks can be described with reference to FIG. 1. As shown, high-speed vehicle 110 (e.g., a high-speed train) will pass through cells 1, 2, 3, and 4 of a wireless network 140, which may be a WWAN. Accordingly, the network 140 will need to coordinate handovers of UEs 120 on board the high-speed vehicle 110 between cells 1 and 2, cells 2 and 3, cells 3 and 4, and so on.

In order to provide reliable communications for travelers on the high-speed train, the network deployment must resolve at least two types of challenges:

(1) When the speed of the vehicle 110 exceeds a certain threshold (e.g., 250 kilometers per hours (km/h)), UEs on board the vehicle 110 may pass through multiple cells (e.g., cells 1 and 2) of the cellular network 140 in a very short amount of time. This may cause excessive signaling load to the network 140, and will often result in radio link failures, handover failures, and even dropped connections (e.g., dropped calls).

(2) Depending on the WWAN technology, in current networks, it can take up to six seconds for a UE to complete a handover between cells, whereas it often takes much less than six seconds for a high-speed train, at top speed, to pass through an overlapping coverage region of two cells (e.g., the overlapping region 145). In such a case, a UE on vehicle 110 cannot reliably complete handovers, resulting in a dropped connection.

One technique which partially ameliorates the problems described above is the use of a mobile relay 130 on board the high-speed vehicle 110. A mobile relay is a relay mounted on the vehicle and capable of wireless communication with macrocells 1, 2, 3, and 4, which may be donor macrocells. Mobile relay 130 is configured to wirelessly relay data between a base station and UEs. The mobile relay 130 maintains a wireless backhaul connection with the base station and hence the network 140. The mobile relay 130 also establishes point-to-multipoint ("PMP") connectivity with the UEs 120 on board the high-speed vehicle 110. Therefore, the mobile relay 130 can provide both uplink and downlink connectivity for each of the UEs 120.

Mobile relay 130 can perform a group mobility procedure for every UE 120 on board the vehicle 110, thereby eliminating the need for individual UE handovers. This reduces the amount of handover signaling required, thereby significantly reducing the overhead on the base stations involved. However, while the use of mobile relay 130 improves handover success rate by reducing the amount of handover signaling required, the group mobility procedure requires that mobile relay 130 itself undergoes handovers between the base stations of cells 1, 2, 3, and 4. Thus, due to the high speed of vehicle 110, mobile relay 130 will itself experience handovers at an excessive rate, resulting in dropped connections for at least the same reasons as described above in relation to individual UEs. This has resulted in the current state of communications on high-speed railways falling short of travelers' demands.

The disclosed embodiments solve the above problems by reducing the complexity of mobile relay communications. Specifically, the disclosed embodiments provide for handovers from cell to cell (or referred to herein as point-to-point) which are transparent to the mobile relay. While, the systems and methods disclosed herein will largely be described with reference to high-speed railways, it should be appreciated that the disclosed embodiments are just as applicable to other high-speed transportation systems with trackable paths, and are not limited to high-speed trains.

SUMMARY

Accordingly, described herein is a method for a transparent handover of a mobile relay on a high-speed vehicle. In an embodiment, the method comprises: by a base station of a wireless communications network, transmitting to a mobile relay on a high-speed vehicle identification data for identifying one or more base stations which are configured for transparent handover; by the wireless communications network, receiving data indicative of a scheduled path of the high-speed vehicle; and, by the wireless communications network, performing a transparent handover of the mobile relay, which is connected to a first base station, to a second base station, wherein the second base station is identified by the identification data, the transparent handover comprising selecting the second base station based on the data indicative of the scheduled path of the high-speed vehicle, and servicing the mobile relay from the second base station.

In addition, described herein is a system for a transparent handover of a mobile relay on a high-speed vehicle. In an embodiment, the system comprises a wireless communications network comprising a plurality of base stations, wherein the plurality of base stations comprises at least a first base station and a second base station, and wherein the wireless communications network: transmit to a mobile relay on a high-speed vehicle identification data for identifying one or more base stations which are configured for transparent handover; receive data indicative of a scheduled path of the high-speed vehicle; and perform a transparent handover of the mobile relay, which is connected to a first base station, to a second base station, wherein the second base station is identified by the identification data, the transparent handover comprising selecting the second base station based on the data indicative of the scheduled path of the high-speed vehicle, and, servicing the mobile relay from the second base station.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, although various embodiments of the present invention are described herein, it is to be understood that these embodiments are presented by way of example only, and not limitation. As such, this detailed description of various alternative embodiments should not be construed to limit the scope or breadth of the present invention as set forth in the appended claims.

Disclosed is a method for reducing the need to perform conventional handover procedures of a mobile relay between two or more base stations when the mobile relay undergoes many cell-to-cell transitions in a short period of time. The mobile relays may experience frequent handovers at such a high rate of speed, resulting in excessive Radio Link Failures ("RLF"). If the mobile relay is on board a high-speed train, for instance, the mobile relay may require a handover between a source base station and a target base station within a few seconds, and potentially within an amount of time which is less than the amount of time required to perform a conventional handover. Thus, as the mobile relay may be servicing multiple UEs (thereby nullifying the need to perform individual UE handovers), users of the UEs may experience dropped calls or other service interruptions under conventional systems, since the handover of the mobile relay may not be completed prior to exiting the acceptable coverage area of the source base station.

Figure 1:
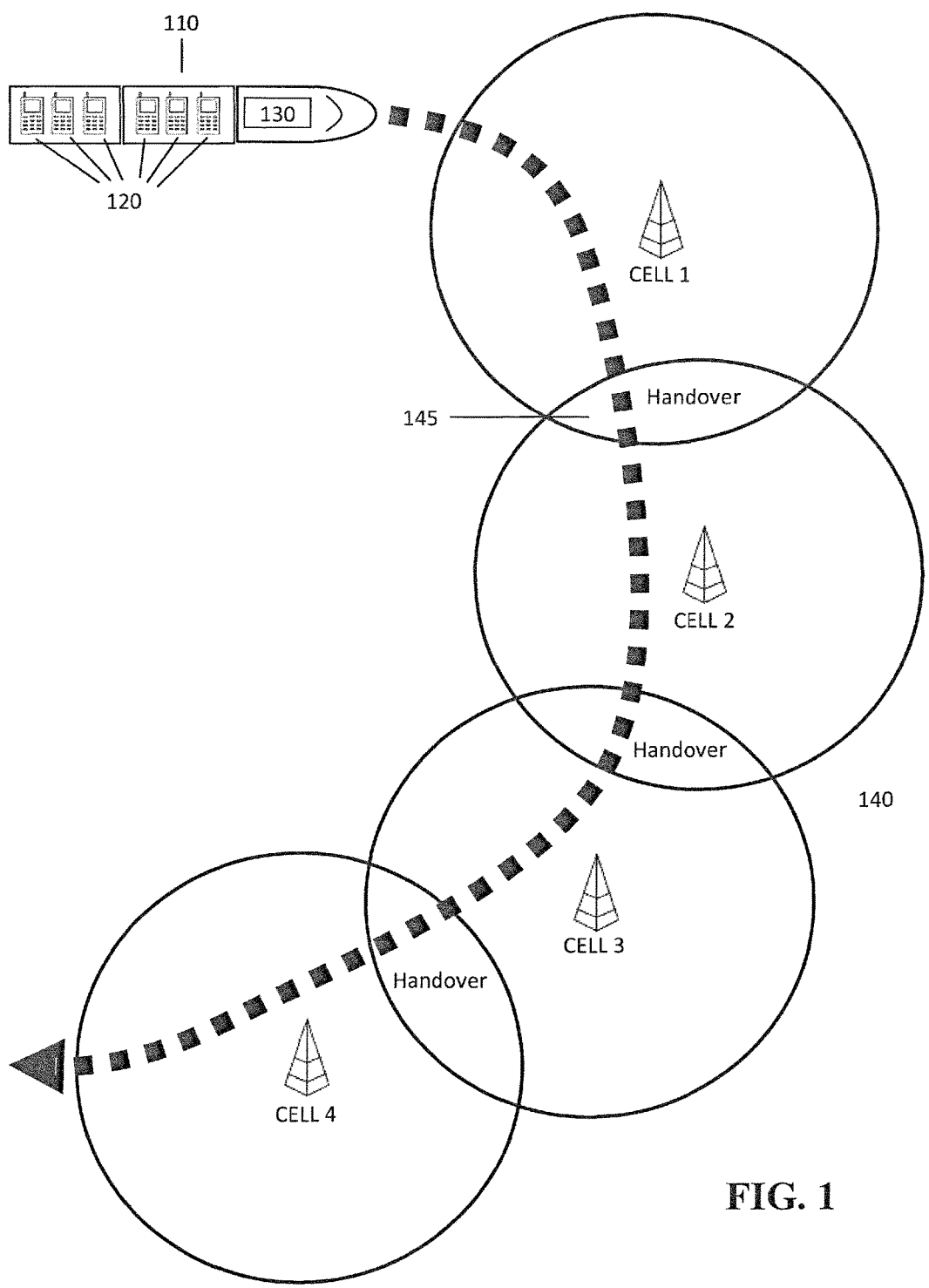
FIG. 1 illustrates the interaction of a high-speed vehicle system with a cellular network, according to an embodiment.

Base stations (e.g., Cells 1-4 in FIG. 1) generally comprise two identifiers:

(1) a base station identity code or physical cell identifier ("PCI") which is typically regionally unique, but not globally unique, and generally broadcast by the base station on its Synchronization Channel ("SCH"). The PCI allows a UE or mobile relay to quickly identify the base station.

(2) an evolved cell global identifier ("ECGI") which is globally unique and generally broadcast by the base station on its Broadcast Channel ("BCH") along with other system information. The system information generally comprises multiple system information blocks, and the ECGI is generally included in System Information Block 1 ("SIB1").

In a conventional handover procedure, the UE only needs to acquire the PCI from the Primary Synchronization Signal (PSS) of the target cell and send the measurement report, including the PCI information, to the source cell. The PSS is transmitted twice every 10 ms and is designed to be easily acquired by the UE. In contrast, the ECGI, sent in System Information Block 1 or SIB1, is transmitted every 80 ms by a cell, and is not normally needed by the source cell to perform the handover decision. In some cases, the source cell may request the UE to obtain the ECGI of the target cell if there is a possibility of PCI confusion. PCI confusion may arise when more than one cell uses the same PCI, since there are only 504 PCIs available for use. Thus, UEs typically do not attempt to acquire the ECGI of a base station. UEs conventionally use the PCI transmitted in the Synchronization Channel to determine whether or not there is a cell change once an event trigger exceeds a predetermined threshold. Notably, mobile relays do not necessarily face the same limitations as UEs.

Each cell in a network is assigned a PCI, and handovers can be triggered based on a triggering event and measurement report associated with the detection of a neighbor cell or target cell having a different PCI. While PCIs are not necessarily unique, adjacent or neighboring cells will conventionally have different PCIs. In a typical handover, a UE or mobile relay will detect a target base station, which it can differentiate from the base station which it is currently connected to (i.e., the source base station) by its differing PCI.

While still within the coverage area of the source base station, the UE or mobile relay will measure the signal strength of the target base station. These measurements are then sent by the UE or mobile relay in a measurement report to the source base station to initialize the handover process. The source cell decides if a handover should occur. In addition, at various times during this handover process, the source base station may request additional information from the UE or mobile relay.

Prior to sending the measurement report to the source cell, the UE/mobile relay will perform a signal strength measurement over a period of time (i.e., "time-to-trigger") based on the configured trigger type in order to prevent ping-pong effects, which would occur if the UE or mobile relay were to be rapidly handed back and forth between the target base station and source base station due to fluctuating signal strengths from one or both base stations. If the signal strength exceeds the threshold, the UE/mobile relay would send the measurement report to the source cell and the source cell may trigger a handover of the UE or mobile relay to the target base station.

In an embodiment of the present invention, prior to triggering the handover, the source base station (e.g., cell 1 in FIG. 1) may instruct the mobile relay 130 to read and report the ECGI of the target base station (e.g., cell 2). According to an embodiment, this instruction to the mobile relay comprises the newly discovered PCI of the target base station as a parameter. The UE or mobile relay may then acquire the ECGI of the target base station from SIB1 of the BCH of the target base station and report the target cell's ECGI to the source cell. The source cell will determine whether it is appropriate to proceed with the handover based on the reported parameters.

While conventional systems can perform handovers within a matter of seconds, in a high-speed context like a high-speed train, a matter of seconds may be too long. The present systems and methods eliminate the need for a mobile relay to participate in handovers between base stations or cells. Whereas according to conventional systems, the mobile relay 130 must convey measurement data to a source base station (e.g., cell 1) in order for the network 140 to determine whether a handover should occur and/or to perform the handover to a target base station (e.g., cell 2), according to disclosed systems and methods network 140 perform handovers which are transparent to the mobile relay 130. In other words, the mobile relay 130 does not need to send measurement data, and may not even know that a handover has occurred. By avoiding the need for the mobile relay 130 to participate in handovers as it transitions from base station to base station or cell to cell, RLF can be minimized.

In an embodiment, each base station or cell can be considered a "point." A point can communicate with mobile relay 139 like a traditional base station or macrocell. However, a point is allowed to share the same ECGI as a neighboring point. Thus, mobile relay 130 which, in an embodiment, is configured to trigger handovers based on the ECGI, rather than the PCI, or which requires the ECGI of the source base station and target base station to be different in order for a handover to occur, would not trigger handovers between two points sharing the same ECGI. Rather, the mobile relay would simply consider the two points as the same cell due to identical ECGIs. From the mobile relay's perspective, the cell is not changing as the mobile relay moves from point to point.

The PCIs of neighboring points (e.g., cells 1 and 2) may continue to be distinct. In other words, neighboring points along the path of the high-speed vehicle 110 may have different PCIs, but the same ECGI. Thus, UEs not onboard the high-speed vehicle 110—and therefore not being serviced by the mobile relay 130—would still trigger handovers (e.g., according to conventional handover processes) as they move between the two points, since UEs conventionally trigger handovers based on PCIs, rather than ECGIs. In this manner, the points can serve both the UEs 120 on high-speed vehicle 110 via mobile relay 130, according to the disclosed embodiments of the present invention, as well as the UEs (e.g., of pedestrians) not onboard the high-speed vehicle, according to conventional means.

Figure 2:
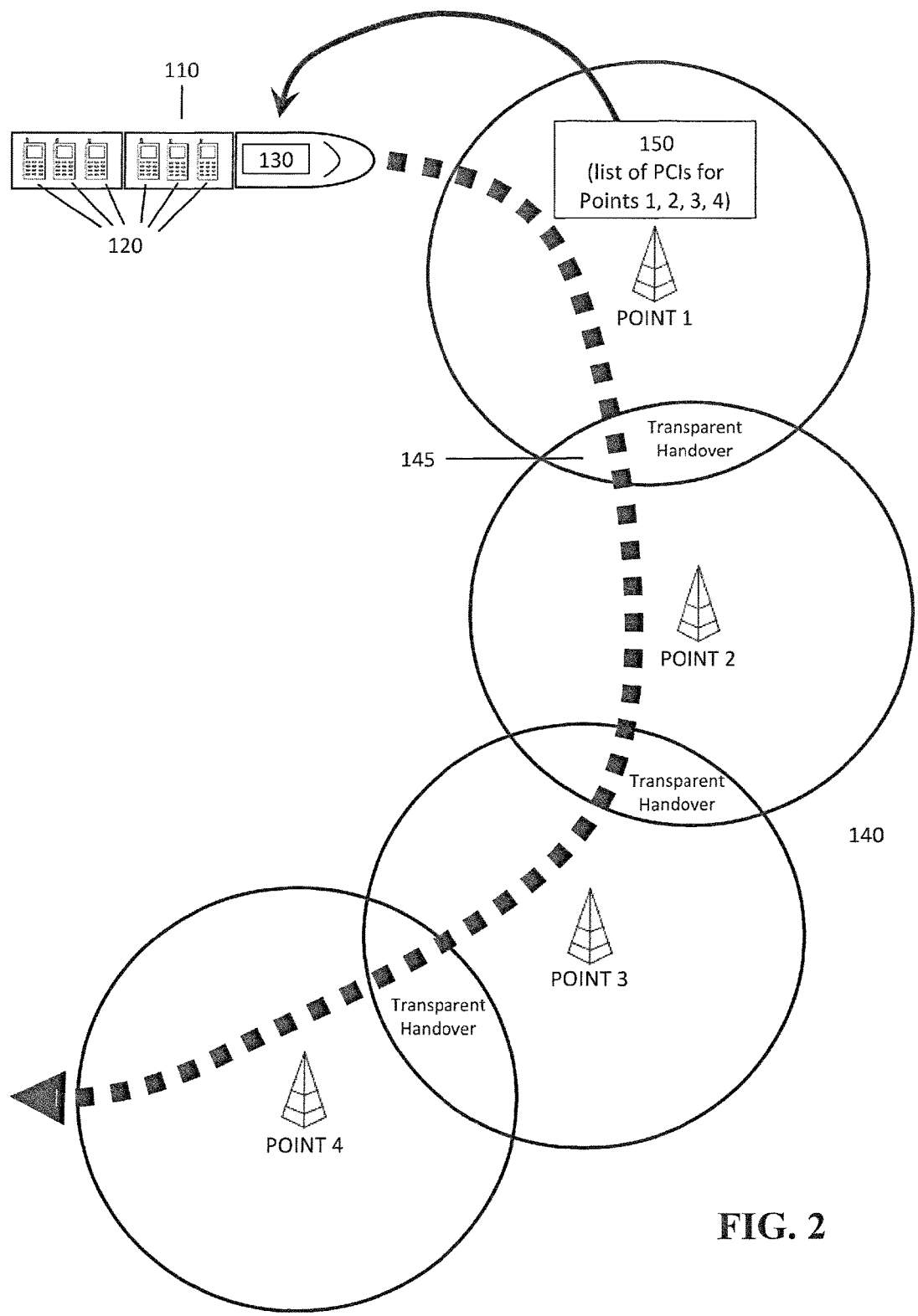
FIG. 2 illustrates an interaction of a high-speed vehicle system with a cellular network, according to an embodiment.

With reference to FIG. 2, in an embodiment, the network 140 informs the mobile relay 130 concerning the PCIs for "transparent" cells (hereinafter, referred to as transparent PCIs). Transparent cells are those which, according to the disclosed embodiments, do not require the mobile relay 130 to report signal measurements or other information to it prior to handover. In an embodiment, the list of transparent PCIs are communicated to the mobile relays through dedicated signaling on the Downlink Shared Channel (DL-SCH). Other methods of informing the mobile relay 130 of the transparent PCIs for cells 1, 2, 3, and 4 include system information transmitted on a common signal channel, e.g., Broadcast Channel (BCH), a message or signal 150 transmitted over the application layer, or any other messaging or signaling means. The message or signal 150 may be sent or broadcast by one or more of the points (e.g., Point 1 as illustrated in FIG. 2). The mobile relay may store this list of transparent PCIs in a data storage area of the mobile relay 130. The data storage area of the mobile relay 130 may be any internal or external memory device, and may include persistent and/or volatile memories.

As discussed above, in an embodiment, the PCIs for points 1, 2, 3, and 4 are different, but the points 1, 2, 3, and 4 share the same ECGI. In an embodiment, if the mobile relay detects the presence of a target point having a PCI which is in the list of transparent PCIs, the mobile relay 130 continues to receive and send messages or data without sending any measurement report or attempting to initiate a handover. Since the handover is not initiated, none of the handover signaling of a conventional handover procedure will be needed. In other words, the mobile relay 130 acts as if it remains within the same cell or point, i.e., the source cell.

Figure 3:
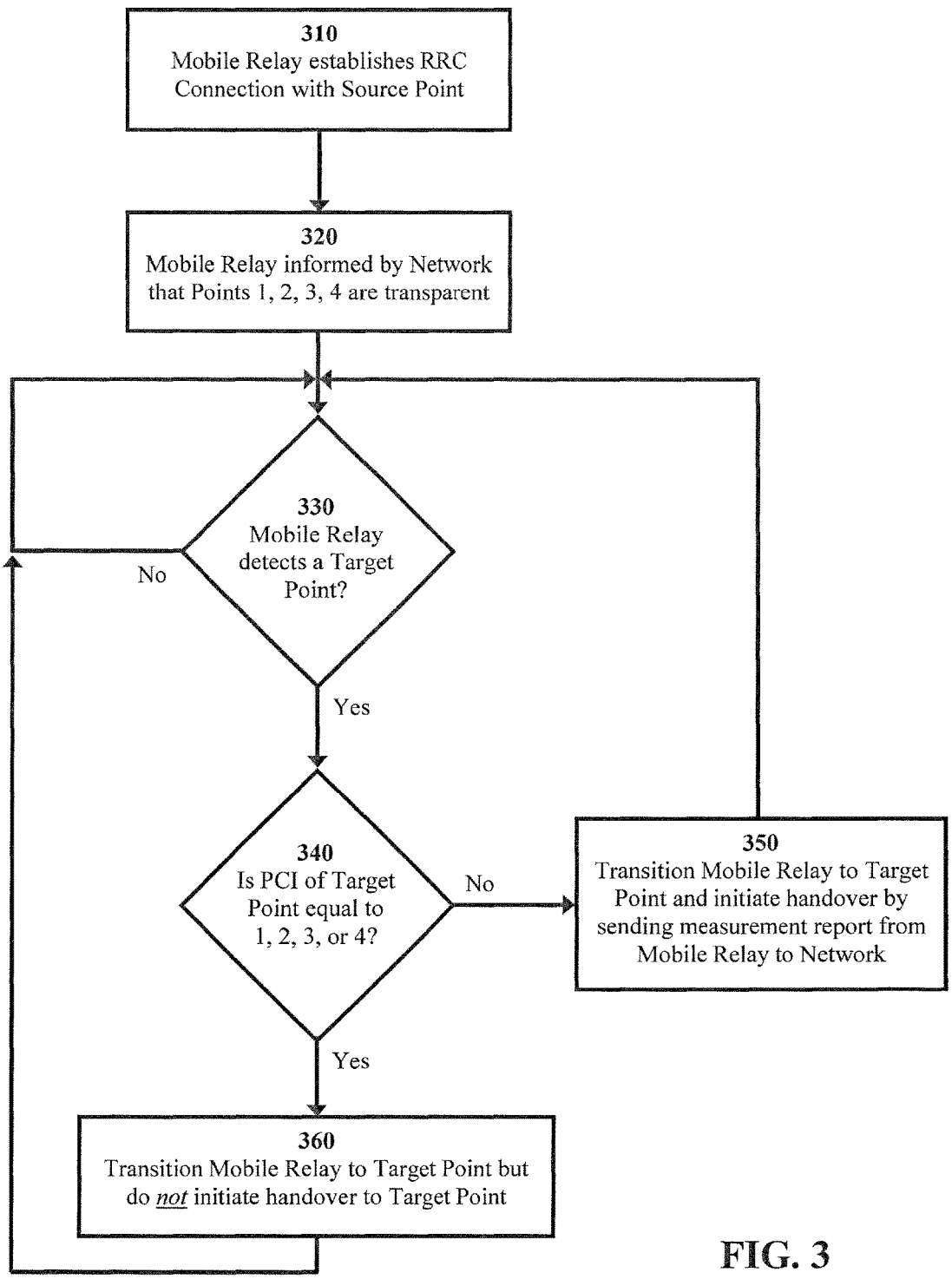
FIG. 3 illustrates a high-level flow chart of a transparent handover procedure, according to an embodiment.

FIG. 3 illustrates a high-level diagram of a method for performing a transparent handover of a mobile relay 130. In block 310, the mobile relay 130 is connected to a source point (e.g., Cell 1 in FIG. 2) having a PCI. The connection may be a Radio Resource Control (RRC) connection.

In block 320, the mobile relay 130 receives a message or signal 150 from network 140, for example, over a dedicated signaling channel. The message or signal may be sent or broadcast by the source point and comprises a list of transparent PCIs, i.e., a list of PCIs associated with target points for which the mobile relay 130 should not initiate a handover. In an embodiment, the mobile relay 130 stores the list of transparent PCIs in a memory on the mobile relay 130. The list of transparent PCIs may be subsequently updated if the mobile relay 130 receives an updated list of transparent PCIs through updated messaging or signaling, and not excluding receiving a SIB broadcasted by the serving cell.

Alternatively, instead of sending a list of transparent PCIs, the network 140 may send the mobile relay 130 a particular rule, set of rules, or algorithm that the mobile relay 130 is to apply in order to determine whether or not a PCI is associated with a transparent point which should not trigger a handover. For example, the network 140 may inform the mobile relay 130 that PCIs which comprise consecutive numbers or other identifiers are associated with transparent points which should not trigger a handover of the mobile relay 130. As with the list, these rules or algorithms may be stored in a memory of the mobile relay 130, and may be updated as needed through further messaging or signaling.

In block 330, the mobile relay 130 determines whether a target point is detected, i.e., a point in range of the mobile relay 130 with a different PCI than the source point. If a target point is detected, the mobile relay 130 transitions to block 340. Otherwise, the mobile relay 130 remains in its current state, i.e., connected to the source point.

In block 340, the mobile relay 130 has detected a target point (e.g., Cell 2 in FIG. 2) that is in range and has a different PCI than the source point. The mobile relay 130 compares the PCI of the target point to the list of transparent PCIs. This comparison may be performed using a list of transparent PCIs stored in a memory of the mobile relay 130, or by comparing the PCI of the target point directly to the list of PCIs in a dedicated signal channel of the network 140. Alternatively, the mobile relay 130 may apply one or more rules or algorithms to the PCI of the target point and/or the PCI of the source point to determine whether the target PCI is associated with a transparent point. If the PCI of the target point is not in the list of transparent PCIs or if the application of the one or more rules or algorithms indicates that the target point is not a transparent point, the mobile relay 130 proceeds to block 350. In block 350, the mobile relay 130 initiates a handover procedure by sending a measurement report to the source point. This handover may be a conventional handover, as is known in the art.

On the other hand, if the PCI of the target point is in the list of transparent PCIs, the mobile relay 130 proceeds to block 360. In block 360, the mobile relay 130 transitions to the target point, but does not initiate a handover procedure to the target point. Instead, the network 140 performs the necessary handover procedures to switch the point that the mobile relay 130 is exchanging data with from the source point to the target point without the need for a measurement report from the mobile relay 130, and without any handover signaling with the mobile relay.

Since the mobile relay is communicating with a different point, a new timing advance is provided by the network. The timing advance is a parameter sent by a point to the mobile relay that the mobile relay may use to adjust the timing of its transmissions to the point in order to compensate for the propagation delay between the mobile relay and the point. A point determines the required timing advance based on the difference between the time at which the point receives a transmission and the time that the transmission should be received to be aligned with the point's time slot structure. In general, the timing advance configured to the mobile relay will be different for each point. When the mobile relay moves from one point to another, a timing advance suitable for the target point must be provided. According to one embodiment, since the geographical position of the mobile relay, relative to each target point along the path, is known by the network, the timing advance associated with a point may be included in a field in the list of transparent PCIs. Alternatively, the timing advance of the target point may be sent prior to the transition by the source point with an indication that the new timing advance is only applicable to the target point.

At some point, the mobile relay starts to receive data from the target point using the target PCI. The mobile relay may continue to use the same cell radio network temporary identifier (C-RNTI) in the target point as was used in the source point, or it may be assigned one associated with each transparent PCI value when it receives the list of transparent PCIs. The time at which the mobile relay starts to communicate with the target point may be based on its location, which it may obtain, for example, from a GPS receiver. It is also possible that the target point only begins to send downlink transmissions using the target PCI after the target point receives an uplink transmission that uses the target PCI.

In order to perform this transparent handover without relying on a measurement report from the mobile relay 130, the network 140 must be able to track the location of the mobile relay 130. Otherwise, the network 140 will not be able to select the most suitable point to serve the mobile relay 130 or even know whether a handover should be initiated in the first place. However, as the path (e.g., speed and heading) of a high-speed vehicle 110 such as a high-speed train is known, the network 140 can simply track the location of the high-speed vehicle 110, instead of relying on a feedback mechanism of the mobile relay 130 to inform the network 140 of the location of the mobile relay 130. In some embodiments, the mobile relay 130 may continue to provide feedback about its location to the network 140, as it may be helpful, albeit not necessary, in some situations for tracking purposes.

The location and/or path of the high-speed vehicle 110 may be received by the network 140, for example, through existing monitoring systems which are generally present for high-speed vehicles 110 such as trains and airplanes. In an embodiment, known information about the speed and heading of the high-speed vehicle 110 is received by a scheduler of a controlling unit located either in each cell or point of the network 140 (e.g., the source point) or in a more central location in the network 140. The scheduler is typically responsible for allocating the resources of one or more points for the connected UEs or mobile relays. In an embodiment, a centralized scheduler is used to coordinate the resources of multiple points.

The scheduler may use the speed and heading of the high-speed vehicle 110 to predict where the mobile relay 130 will be located in the future. The backhaul link between the point and the mobile relay 130 and resource scheduling may be similar to conventional mobile relay operations (i.e., operations without transparent PCI). A simple scheduler implementation can allocate resources using spatial-beam shifting to direct transmission and/or reception of signals along the path of the high-speed vehicle 110 (and thus the path of the mobile relay 130), using the information about the speed or velocity of the high-speed vehicle 110 received from an external monitoring system. The transmission/reception point for the spatial-beam shifting can be handed over to a target point once it is determined, based on the path of the train, that a handover to the target point should be initiated. It is not difficult for the network 140 to determine the location of the high-speed vehicle 110 and select the correct point to server the mobile relay or relays 130 on the high-speed vehicle 110 at the proper time. For example, the scheduler can use a speed estimate, GPS, track installed triggers, and other methods to determine the location and/or path of the high-speed vehicle 110.

Figure 4:
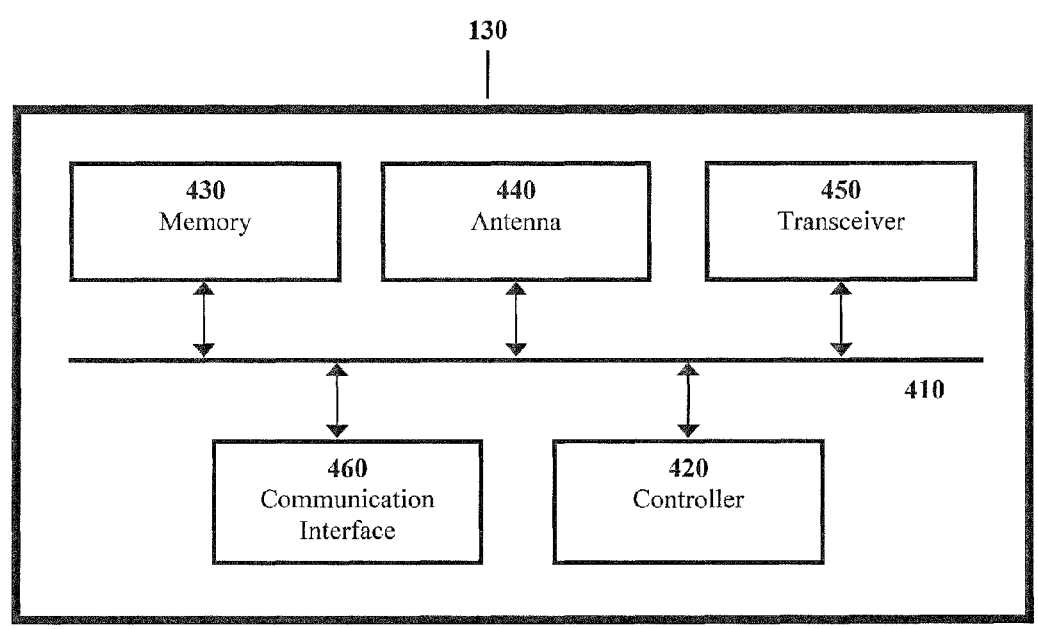
FIG. 4 illustrates a high-level block diagram of a mobile relay, according to an embodiment.

FIG. 4 is a high-level block diagram illustrating an example mobile relay 130 that may be used in connection with various embodiments described herein. As will be clear to those skilled in the art, other configurations and/or architectures may also be used. In the illustrated embodiment, mobile relay 130 may comprises a bus 410, controller 420, memory 430, antenna or antennae 440, transceiver(s) 450, and a communication interface 460. The bus 410 may permit communication among the components of the mobile relay 130.

Controller 420 may include one or more processors or microprocessors that execute instructions, which may be stored in memory 430. Memory 430 may include both volatile and non-volatile storage devices. For instance, memory 430 may include a random access memory (RAM) or another type of volatile storage device that stores information and instructions for execution by the processor(s) of controller 420. Memory 430 may also include a non-volatile storage device that stores persistent copies of executable software modules (i.e., instructions) and other data. Alternatively or additionally, memory 430 may include a read-only memory (ROM) that stores static instructions or other data.

The mobile relay 130 may perform the various functions disclosed herein by executing sequences of instructions stored in a computer-readable medium, such as, for example, memory 430, or other storage device(s), including external storage devices such as optical disks. In this description, the term "computer readable medium" is used to refer to any media used to provide executable instructions (e.g., software and computer programs) to the mobile relay 130 for execution by the controller 420. These computer readable mediums are means for providing executable code, programming instructions, and software to the mobile relay 130. The executable code, programming instructions, and software, when executed by the controller 420, preferably cause the processor(s) to perform the inventive features and functions previously described herein.

Transceiver 450 may include one or more transmitters and receivers. The transceiver 450 may include functionality to interface with any network or communications station and may be defined by hardware and/or software in any manner known to one of skill in the art. The transceiver 450 may support communication activities and links within the network 140. The controller 420 is cooperatively operable with the transceiver 450 to support operations within the wireless network 140.

Communications interface 460 may include any mechanism that facilitates the mobile relay 130 to communicate via the network 140, including mechanisms for assisting transceiver 450 in communicating with other devices and/or systems via wireless connections.

The mobile relay 130 may perform such functions as disclosed herein by executing sequences of instructions stored in a computer-readable medium, such as, for example, memory 430, or other storage device(s), including external storage devices such as optical disks.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for a transparent handover of a mobile relay on a high-speed vehicle, the method comprising:
   by a base station of a wireless communications network, transmitting to a mobile relay on a high-speed vehicle identification data for identifying one or more base stations which are configured for transparent handover;
   by the wireless communications network, receiving data indicative of a scheduled path of the high-speed vehicle; and
   by the wireless communications network, performing a transparent handover of the mobile relay from a first base station to a second base station, wherein the second base station is identified by the identification data and selection of the second base station is performed without any measurement report or other handover-relevant information received from the mobile relay, the transparent handover comprising
      selecting the second base station based on the data indicative of the scheduled path of the high-speed vehicle, and,
      servicing the mobile relay from the second base station;
   by the mobile relay, determining whether a third base station is configured for transparent handover; wherein
   if it is determined that the third base station is configured for transparent handover, not triggering a conventional handover to the third base station; and
   if it is determined that the third base station is not configured for transparent handover, triggering a conventional handover to the third base station.

2. The method of claim 1, wherein the identification data comprise a list of physical cell identifiers.

3. The method of claim 2, wherein the identification data further comprises, for each of the physical cell identifiers, one or more associated parameters necessary for operations within a corresponding one of the identified one or more base stations.

4. The method of claim 3, wherein the one or more associated parameters comprise a cell radio network temporary identifier.

5. The method of claim 3, wherein the one or more associated parameters comprise a timing advance.

6. The method of claim 1, wherein the transparent handover further comprises sending, from the first base station to the mobile relay, a timing advance associated with the second base station.

7. The method of claim 1, wherein the identification data comprise one or more rules for determining physical cell identifiers of the one or more base stations which are configured for transparent handover.

8. The method of claim 1, wherein the data indicative of a scheduled path of the high-speed vehicle comprise a speed and heading of the high-speed vehicle.

9. The method of claim 1, further comprising, by the mobile relay:
receiving the identification data; and
detecting a third base station and a handover triggering event.

10. The method of claim 1, further comprising, by the second base station, transmitting a physical cell identifier which is different than the physical cell identifier of the first base station.

11. The method of claim 10, wherein the physical cell identifier is transmitted on a synchronization channel of the second base station.

12. The method of claim 1, wherein the high-speed vehicle is a train.

13. The method of claim 1, wherein the identification data is transmitted on a dedicated signal channel.

14. The method of claim 1, wherein the identification data is broadcast on a common control channel.

15. The method of claim 1, wherein the identification data is transmitted over an application layer.

16. A system for a transparent handover of a mobile relay on a high-speed vehicle, the system comprising a wireless communications network comprising a plurality of base stations, wherein the plurality of base stations comprises at least a first base station and a second base station, and wherein the wireless communications network:
transmit to a mobile relay on a high-speed vehicle identification data for identifying one or more base stations which are configured for transparent handover;
receive data indicative of a scheduled path of the high-speed vehicle; and
perform a transparent handover of the mobile relay from a first base station to a second base station, wherein the second base station is identified by the identification data and selection of the second base station is performed without any measurement report or other handover-relevant information received from the mobile relay, the transparent handover comprising
selecting the second base station based on the data indicative of the scheduled path of the high-speed vehicle, and,
servicing the mobile relay from the second base station,
determine whether a third base station is configured for transparent handover;
wherein if it is determined that the third base station is configured for transparent handover, not trigger a conventional handover to the third base station; and
if it is determined that the third base station is not configured for transparent handover, trigger a conventional handover to the third base station.

17. The system of claim 16, wherein the identification data comprise a list of physical cell identifiers.

18. The system of claim 17, wherein the identification data further comprises, for each of the physical cell identifiers, one or more associated parameters necessary for operations within a corresponding one of the identified one or more base stations.

19. The system of claim 18, wherein the one or more associated parameters comprise a cell radio network temporary identifier.

20. The system of claim 18, wherein the one or more associated parameters comprise a timing advance.

21. The system of claim 16, wherein the transparent handover further comprises sending, from the first base station to the mobile relay, a timing advance associated with the second base station.

22. The system of claim 16, wherein the identification data comprise one or more rules for determining physical cell identifiers of the one or more base stations which are configured for transparent handover.

23. The system of claim 16, wherein the data indicative of a scheduled path of the high-speed vehicle comprise a speed and heading of the high-speed vehicle.

24. The system of claim 16, further comprising the mobile relay, wherein the mobile relay:
receives the identification data; and
detects a third base station and a handover triggering event.

25. The system of claim 16, wherein the second base station transmits a physical cell identifier which is different than the physical cell identifier of the first base station.

26. The system of claim 25, wherein the physical cell identifier is transmitted on a synchronization channel of the second base station.

27. The system of claim 16, wherein the high-speed vehicle is a train.

28. The system of claim 16, wherein the identification data is transmitted on a dedicated signal channel.

29. The system of claim 16, wherein the identification data is broadcast on a common control channel.

30. The system of claim 16, wherein the identification data is transmitted over an application layer.

* * * * *